United States Patent
O'Brien (10) Patent No.: US 9,673,594 B2
(45) Date of Patent: Jun. 6, 2017

(54) TOUCH-SAFE BUS CONNECTION SLIDER CIRCUIT BREAKER PANEL

(71) Applicant: SCHNEIDER ELECTRIC USA, INC., Schaumburg, IL (US)

(72) Inventor: Daniel O'Brien, La Vergne, TN (US)

(73) Assignee: Schneider Electric USA, Inc., Schaumburg, IL (US)

( * ) Notice: Subject to any disclaimer, the term of this patent is extended or adjusted under 35 U.S.C. 154(b) by 0 days.

(21) Appl. No.: 14/900,241

(22) PCT Filed: Jun. 27, 2013

(86) PCT No.: PCT/US2013/048128
§ 371 (c)(1),
(2) Date: Dec. 21, 2015

(87) PCT Pub. No.: WO2014/209317
PCT Pub. Date: Dec. 31, 2014

(65) Prior Publication Data
US 2016/0156161 A1   Jun. 2, 2016

(51) Int. Cl.
*H02B 1/06* (2006.01)
*H02B 1/42* (2006.01)
(Continued)

(52) U.S. Cl.
CPC ............... *H02B 1/06* (2013.01); *H02B 1/205* (2013.01); *H01R 13/447* (2013.01); *H02B 1/056* (2013.01);
(Continued)

(58) Field of Classification Search
CPC ............ H02B 1/06–1/066; H02B 1/14; H02B 1/40–1/42; H02B 1/46–1/48; H02B 1/523–1/526; H01R 13/447–13/4538
(Continued)

(56) References Cited

U.S. PATENT DOCUMENTS 2,530,548 A    11/1950  Stanley
5,933,319 A *  8/1999  Buckner ................ H02B 1/056
                                             200/50.22
(Continued)

OTHER PUBLICATIONS

International Search Report and Written Opinion for PCT/US13/48128 mailed Dec. 3, 2013, 13pp.
(Continued)

*Primary Examiner* — Zachary M Pape
(74) *Attorney, Agent, or Firm* — Locke Lord LLP (57) ABSTRACT

A touch-safe bus connection device includes a bus extension (160, 260, 360), a non-conductive housing (110, 210, 310), a moveable electrical contact (150, 250, 350) and a moveable non-conductive cover (140, 240, 340). The contact is arranged in the housing, and is moved to connect or disconnect the extension and a stab of an electrical panel across a gap (192, 292, 392). The cover is concurrently and automatically moved to uncover or cover an opening (116, 216, 316) of the housing to allow or restrict, respectively, access to the extension. The contact and cover are concurrently and automatically moveable between a position at which the contact bridges the gap to connect the extension and the stab and the opening of the housing is covered by the cover, and another position at which the extension and the stab are disconnected across the gap and the opening of the housing is uncovered.

13 Claims, 7 Drawing Sheets

(51) Int. Cl.
  *H02B 1/48*  (2006.01)
  *H02B 1/20*  (2006.01)
  *H02B 1/14*  (2006.01)
  *H01R 13/447*  (2006.01)
  *H02B 1/056*  (2006.01)

(52) U.S. Cl.
  CPC .............. *H02B 1/14* (2013.01); *H02B 1/42* (2013.01); *H02B 1/48* (2013.01)

(58) Field of Classification Search
  USPC ................................ 361/634–636, 652–656
  See application file for complete search history.

(56) References Cited

U.S. PATENT DOCUMENTS

| | | |
|---|---|---|
| 8,223,475 B2 | 7/2012 | Baird et al. |
| 9,312,666 B1 * | 4/2016 | Walgenbach .......... H01H 73/08 |
| 9,450,384 B2 * | 9/2016 | Sharp ................. H01R 13/4538 |
| 9,564,741 B1 * | 2/2017 | Mittelstadt ............... H02B 1/14 |
| 2010/0238611 A1 | 9/2010 | Deboer et al. |
| 2013/0140915 A1 | 6/2013 | Spitaels |

OTHER PUBLICATIONS

ABB Proline panelboard brochure, "Low Voltage Products and Systems," Jul. 2009, 20pp.

\* cited by examiner

TOUCH-SAFE BUS CONNECTION SLIDER CIRCUIT BREAKER PANEL

FIELD

The present disclosure relates to the field of electrical panels for switching equipment, and more particularly, to a touch-safe bus connection device for an electrical panel such as a circuit breaker panel.

BACKGROUND

An electrical panel includes live conductors, such as a main bus and individual connection points on the bus (also referred to as "stabs") which are connectable to electrical devices, such as breakers and other switching equipment. When installing or removing an electrical device on the panel, a person may come in direct contact with exposed live conductors—a hazardous situation. Thus, it is recommended that power be shut off to the main bus as a precaution when electrical devices are being installed or removed. Nevertheless, individuals may not always remember to do so or may intentionally keep the power on in the interest of saving time. Moreover, shutting off power to the main bus can be a major inconvenience for both residential and business consumers, but is particularly inconvenient for businesses, such as data centers, which rely on a constant source of power to conduct their business affairs.

SUMMARY

Accordingly, the present disclosure provides a touch-safe bus connection device to restrict direct user contact of live conductors in an electrical panel irrespective of whether an electrical device is engaged, and to allow installation or removal of an electrical device from the panel without having to shut off power to the main bus. The touch-safe bus connection device includes a bus extension arranged between a stab of the panel and a terminal of an electrical device, and a movable non-conductive cover. The cover restricts access to a terminal connection site of the bus extension when the bus extension is connected to the stab, but allows access to the terminal connection site of the bus extension when the bus extension is disconnected from the stab.

In accordance with an embodiment, a touch-safe bus connection device includes a bus extension, a non-conductive housing, a moveable electrical contact and a moveable non-conductive cover. The bus extension is arranged in the housing, and has a first end to be arranged at a gap from a stab of the electrical panel, and a second end for connecting to a terminal of an electrical device. The housing includes a first opening to allow connection of the first end of the bus extension to the stab and a second opening to allow connection of the terminal of the electrical device to the second end of the bus extension. The electrical contact is arranged in the housing, and is moved to connect or disconnect the first end of the bus extension and the stab of the electrical panel across the gap. The cover is moved concurrently with the electrical contact to uncover or cover the second opening of the housing to allow or restrict, respectively, access to the second end of the bus extension. The electrical contact and the cover are moveable between a first position and a second position. In the first position, the electrical contact bridges the gap to connect the first end of the bus extension and the stab, and the second opening of the housing is covered by the cover. In the second position, the first end of the bus extension and the stab are disconnected from each other across the gap, and the second opening of the housing is uncovered. The touch-safe bus connection device can employ a sliding switch or a lever switch to move the electrical contact and the cover.

BRIEF DESCRIPTION OF THE DRAWINGS

The description of the various exemplary embodiments is explained in conjunction with the appended drawings, in which.

DETAILED DESCRIPTION

In accordance with various disclosed embodiments, there is provided a touch-safe bus connection device for an electrical panel, such as a circuit breaker panel.

Figure 1:
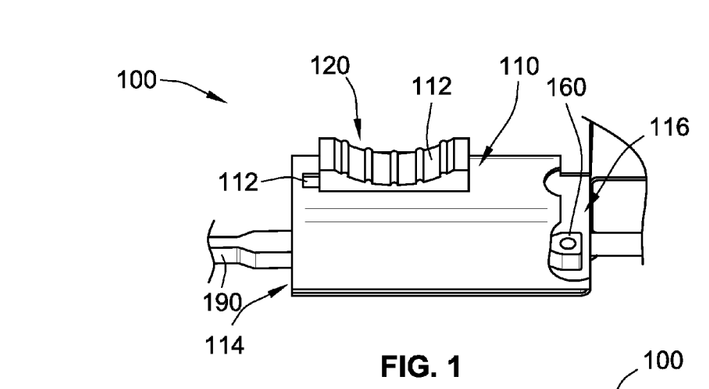
FIG. 1 illustrates a perspective view of a touch-safe bus connection device for an electrical panel, which employs a sliding switch. The device is in an open position configured to disconnect a bus extension of the device to a stab of the electrical panel and concurrently allow direct user access to the bus extension, in accordance with the first embodiment of the present disclosure.
Figure 2:
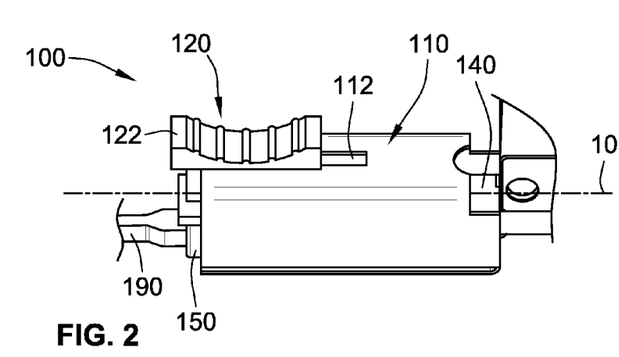
FIG. 2 illustrates another perspective view of the touch-safe bus connection device of FIG. 1, which is in a closed position configured to connect the bus extension to the stab and concurrently prevent direct user access to the bus extension.
Figure 4:
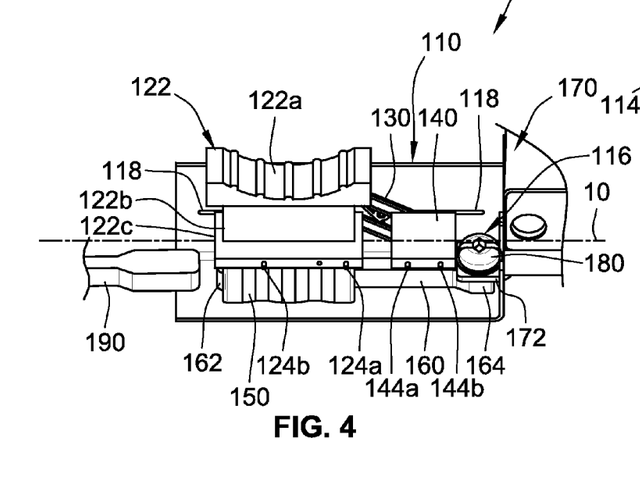
FIG. 4 illustrates a perspective cut-out view of the touch-safe bus connection device of FIG. 1, which is in an open position and has the bus extension connected to the breaker.
Figure 5:
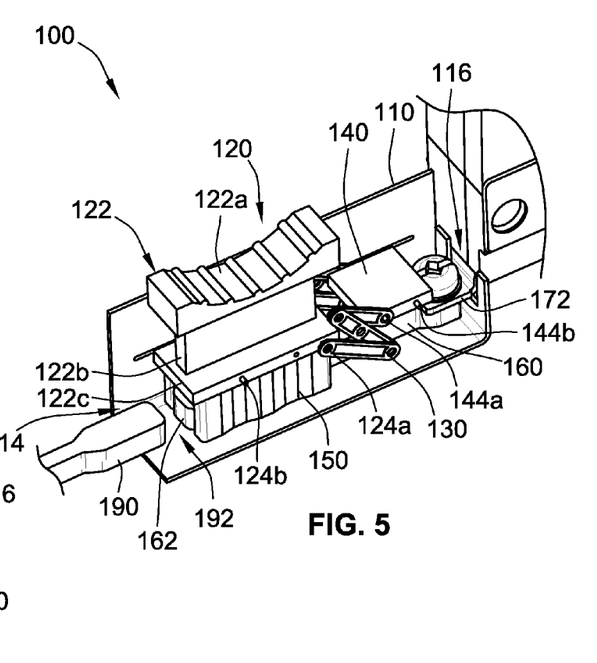
FIG. 5 illustrates another perspective cut-out view of the touch-safe bus connection device of FIG. 1, which is in the open position and has the bus extension connected to the breaker.

FIG. 1 illustrates a perspective view of a touch-safe bus connection device 100 for an electrical panel in accordance with a first embodiment of the present disclosure. FIGS. 4 and 5 also show the device 100 of FIG. 1 from different perspective cut-out views. As shown in FIGS. 1, 4 and 5, the device 100 includes a non-conductive housing 110 having a slot 112 and openings 114 and 116. In FIGS. 4 and 5, a conductive bus extension 160 is arranged inside the housing 110. The bus extension 160 extends along a longitudinal axis 10 of the device 100, and includes two ends 162 and 164. In FIG. 5, the end 162 is arranged at a gap 192 across from a stab 190 of an electrical panel via the opening 114 of the housing 110. The end 164 includes a hole for engaging and fastening a terminal 172 of an electrical device, such as a breaker 170, through the opening 116 of the housing 110. The terminal 172 is fastened to the end 164 of the bus extension 160 with a screw 180, as shown in FIG. 4.

As further shown in FIGS. 4 and 5, the device 100 also includes a slider switch 120, a non-conductive cover 140, and an electrical contact 150. The slider switch 120 includes a non-conductive slider 122, and one or more linkage arms 130. The slider 122 is moveably engaged in the slot 112 of the housing 110 (shown in FIG. 1), and slides along a longitudinal axis 10 of the housing 110. In this example, the slider 122 is an H-slot slider, and includes a top portion 122A arranged outside the housing 110, a middle portion 122B arranged in the slot 112 (shown in FIG. 1) and a bottom portion 122C arranged inside the housing 110. The electrical contact 150 is connected to a bottom of the bottom portion 122C of the slider 122, and moves with the slider 122. Each side of the bottom portion 122C of the slider 122 includes a pair of spaced-apart extending tabs 124A and 124B, which are engaged to slide in corresponding horizontal grooves 118 (shown in FIG. 4) on opposite side walls of the housing 110 along the longitudinal axis 10. The cover 140 includes a pair of extending spaced-apart tabs 144A and 144B, which are also engaged to slide in corresponding horizontal grooves 118 (shown in FIG. 4) on opposite side walls of the housing 110 along the longitudinal axis 10. Each side of the slider 122 and the cover 140 is connected together by a separate linkage arm 130. As shown in FIG. 5, each linkage arm 130 has one end connected to the extending tab 124A of the slider 122 and the other end connected to a corresponding extending tab 144A of the cover 140.

The device 100 is operable via the slider switch 120 between an open position as shown in FIGS. 1, 4 and 5, and a closed position as shown in FIGS. 2, 3, 6 and 7. The slider 122 of the switch 120 is slid in an open direction to concurrently and automatically move both the electrical contact 150 and the cover 140 towards each other to the open position in FIGS. 1, 4 and 5. In particular, the movement of the switch 120, via the slider 122, in the open direction causes the linkage arms 130 to retract, and thus, responsively moves the electrical contact 150 and the cover 140 towards each other. As shown in FIGS. 4 and 5, in the open position, the end 164 of the bus extension 160 and the stab 190 are disconnected from each other across the gap 192 and the opening 116 of the housing 110 is uncovered. Accordingly, the end 164 of the bus extension 160 is accessible through the opening 116 of the housing 110, and an electrical device, such as the breaker 170, may be connected to or disconnected from the bus extension 160. In this example, the cover 140 and the electrical contact 150 are responsively connected to each other, across the slider 122 and the linkage arm 130.

Figure 3:
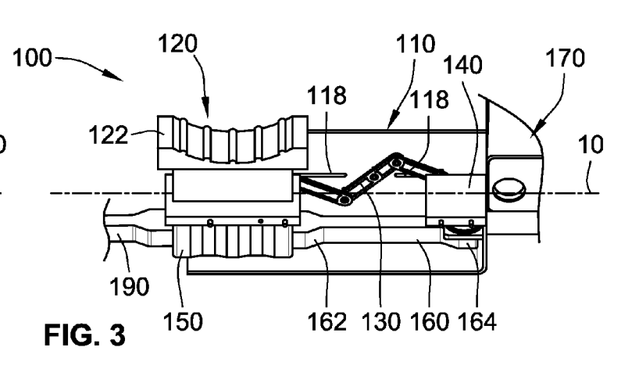
FIG. 3 illustrates a perspective cut-out view of the touch-safe bus connection device of FIG. 1, which is in the closed position and has the bus extension connected to an electrical device, such as a breaker.
Figure 6:
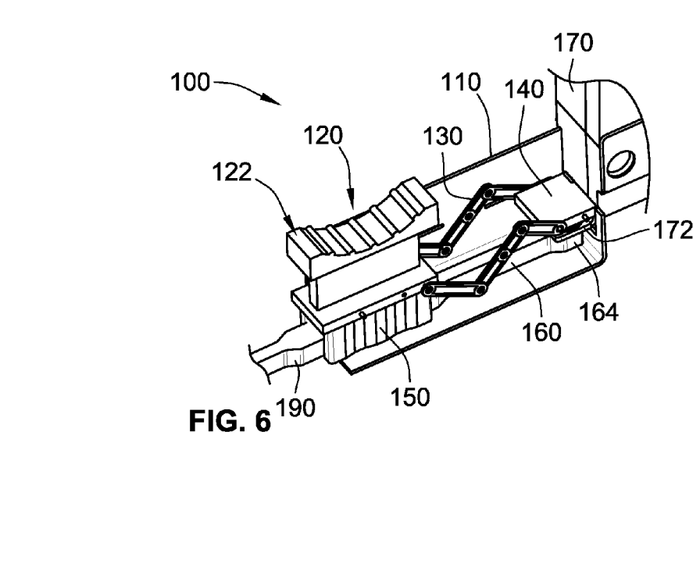
FIG. 6 illustrates another perspective cut-out view of the touch-safe bus connection device of FIG. 1, which is in the closed position and has the bus extension connected to a breaker.
Figure 7:
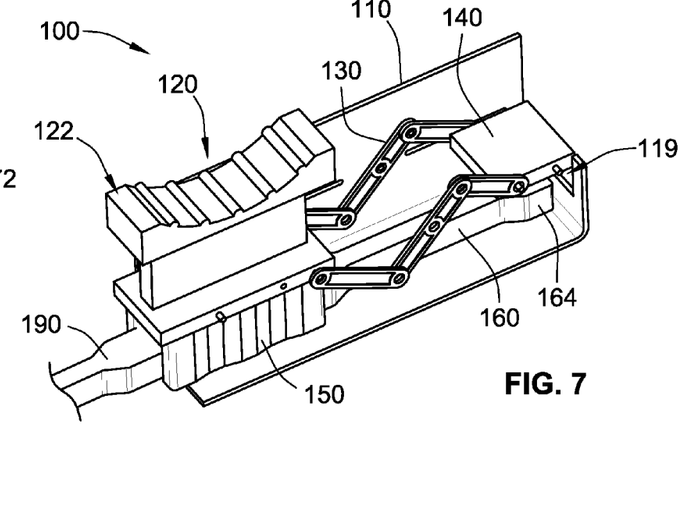
FIG. 7 illustrates a further perspective cut-out view of the touch-safe bus connection device of FIG. 1, which is in the closed position and does not have the bus extension connected to the breaker.

To move the device 100 to the closed position as shown in FIGS. 2, 3, 6 and 7, the slider 122 of the switch 120 is slid in a closed direction, which is opposite to the open direction, to concurrently and automatically move both the electrical contact 150 and the cover 140 away from each other. As shown in FIGS. 3, 6 and 7, the movement of the switch 120, via the slider 122, in the closed direction causes the linkage arms 130 to expand, and thus, responsively moves the electrical contact 150 and the cover 140 away each other. In the closed position, the electrical contact 150 bridges the gap 192 to connect the end 162 of the bus extension 160 (shown as engaged in the electrical contact 150) and the stab 190, and the opening 116 of the housing 110 is covered by the cover 140. Accordingly, in the closed position, the device 100 prevents direct user access to the bus extension 160, when the breaker 170 is connected to the bus extension 160 (in FIG. 6) as well as when no breaker is connected to the bus extension 160 (in FIG. 7).

As further shown in FIGS. 6 and 7, in the closed position, the housing 110 and the cover 140 form a window 119 that is configured in size and shape to allow the terminal 172 of the breaker 170 to extend therethrough when connected to the end 164 of the bus extension 160, and to prevent direct user contact of the bus extension 160. The window 119 may also be configured in size and shape to allow insertion of a test probe into the housing 110.

Figure 8:
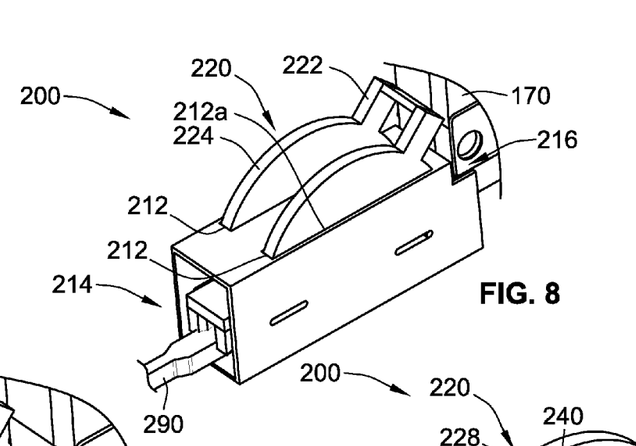
FIG. 8 illustrates a perspective view of a touch-safe bus connection device for an electrical panel, which employs a lever switch and is in a closed position configured to connect a bus extension of the device to a stab of the panel and concurrently prevent direct user access to the bus extension in accordance with the second embodiment of the present disclosure.
Figure 9:
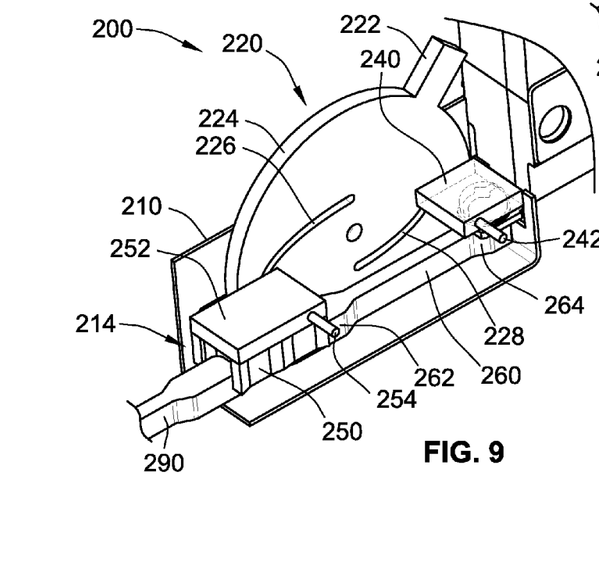
FIG. 9 illustrates a perspective cut-out view of a touch-safe bus connection device of FIG. 8 in a closed position.
Figure 10:
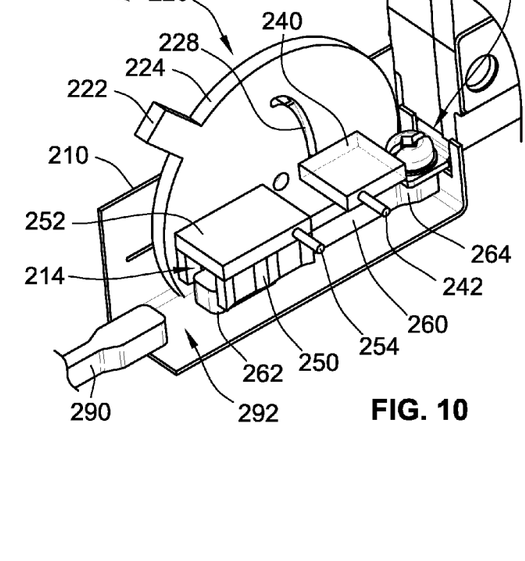
FIG. 10 illustrates another perspective cut-out view of the touch-safe bus connection device of FIG. 8, which is in an open position configured to disconnect the bus extension of the device from the stab of the panel and concurrently allow direct user access to the bus extension.

FIG. 8 illustrates a perspective view of a touch-safe bus connection device 200 in accordance with a second embodiment of the present disclosure. FIGS. 9 and 10 show perspective cut-out views of the device 200 in a closed position and an open position, respectively. The device 200 operates in a similar manner as the device 100, described above, except that the device 200 employs a lever switch instead of a slider switch.

As shown in FIGS. 8-10, the device 200 includes a non-conductive housing 210 and a conductive bus extension 260 arranged inside the housing 210. In FIG. 8, the housing 210 includes a pair of slots 212A on a top of the housing 210 and a corresponding pair of slots 212B on a bottom of the housing 210. The housing 210 also includes openings 214 and 216. As further shown in FIGS. 9 and 10, the bus extension 260 includes two ends 262 and 264. The end 262 is arranged at a gap 292 across from a stab 290 of an electrical panel via the opening 214 of the housing 210. An electrical device, such as the breaker 170, may be engaged and fastened to the end 264 of the bus extension 260 through the opening 216 of the housing 210.

The device 200 also includes a lever switch 220, a non-conductive moveable cover 240 to cover and uncover the opening 216 of the housing 210, and a moveable electrical contact 250 to connect or disconnect the stab 290 and the bus extension 260 to or from each other, respectively, across the gap 292. The lever switch 220 includes a lever handle 222 and two discs 224 as shown in FIG. 8 and a slider 252 as shown in FIGS. 9 and 10. The discs 224 are arranged in parallel inside the housing 210. In FIG. 8, each disc 224 has a portion extending out from a corresponding top slot 212A and bottom slot 212B of the housing 210. The handle 222 is a U-shaped lever handle having two ends, each of which is connected to a different disc 224. The slider 252 is connected to the electrical contact 250 as shown in FIGS. 9 and 10.

In FIGS. 9 and 10, each disc 224 includes a cam profile 226 and a cam profile 228. The slider 252 includes an extending tab 254 on each side of the slider, and is arranged between the two discs 224. The two tabs 254 of the slider 252 are movably engaged in the cam profile 226 of the two discs 224. The cam profile 226 is a groove or slot formed on each of the discs 224, and defines a movement path of the electrical contact 250 via the slider when the discs are rotated. Similarly, the cover 240 includes an extending tab 242 on each side of the cover, and is also arranged between the two discs 224. The two tabs 242 of the cover 240 are movably engaged in the cam profile 228 of the two discs 224. The cam profile 228 is a groove or slot formed on each of the discs 224, and defines a movement path of the cover 240 when the discs 224 are rotated. The tabs 242 and 254 are configured with a sufficient size and shape, e.g., a cross-sectional length longer than a height of the grooves or slots of the cam profile, so that the tabs slide along corresponding cam profiles without rotating. In this example, the cover 240 and the electrical contact 250 are responsively connected to each other, across the discs 224 and the slider 252.

Figure 11:
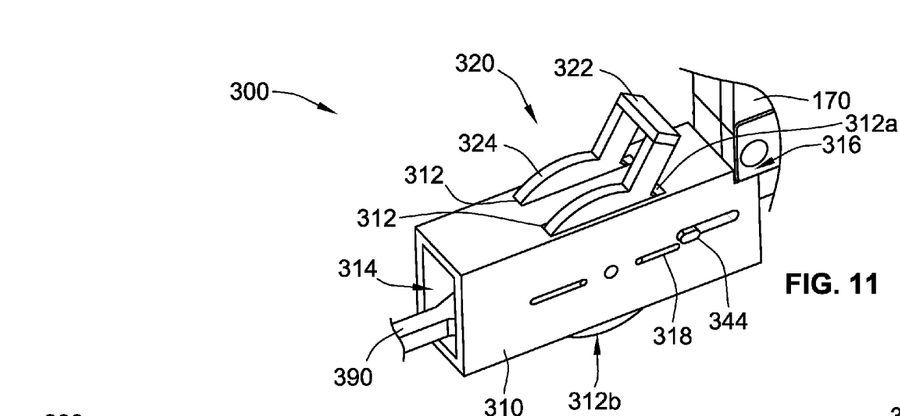
FIG. 11 illustrates a perspective view of a touch-safe bus connection device for an electrical panel, which employs a lever switch and is in an open position configured to disconnect a bus extension of the device from a stab of the panel and concurrently allow direct user access to the bus extension, in accordance with a third embodiment of the present disclosure.

The device 200 is operable via the lever switch 220 between an open position (in FIG. 10) and a closed position (as shown in FIGS. 9 and 11). As shown in FIG. 10, the lever handle 222 is toggled in an open direction to concurrently and automatically move both the electrical contact 250 and the cover 240 towards each other to the open position. In particular, the movement of the switch 220, via the handle 222, in the open direction causes the discs 224 to rotate, and thus, responsively moves the electrical contact 250 and the cover 240 towards each other. In the open position, the end 264 of the bus extension 260 and the stab 290 are disconnected from each other across the gap 292 and the opening 216 of the housing 210 is uncovered. Accordingly, the end 264 of the bus extension 260 is accessible through the opening 216 of the housing 210, and an electrical device, such as the breaker 170, may be connected to or disconnected from the bus extension 260.

As shown in FIGS. 8 and 9, to move the device 200 to the closed position, the lever handle 222 of the lever switch 220 is toggled in a closed direction, which is opposite to the open direction, to concurrently and automatically move both the electrical contact 250 and the cover 240 away from each other. In particular, the movement of the switch 220, via the handle 222, in the closed direction causes the discs 224 to rotate, and thus, responsively moves the electrical contact 150 and the cover 140 away each other. As shown in FIG. 9, in the closed position, the electrical contact 250 bridges the gap 292 to connect the end 262 of the bus extension 260 and the stab 290, and the opening 216 of the housing 210 is covered by the cover 140. Accordingly, as with the device 100 (described above), the device 200 prevents direct user access to the bus extension 260 in the closed position, when the breaker 170 is connected to the bus extension 260 as well as when no breaker is connected to the bus extension 160.

Figure 12:
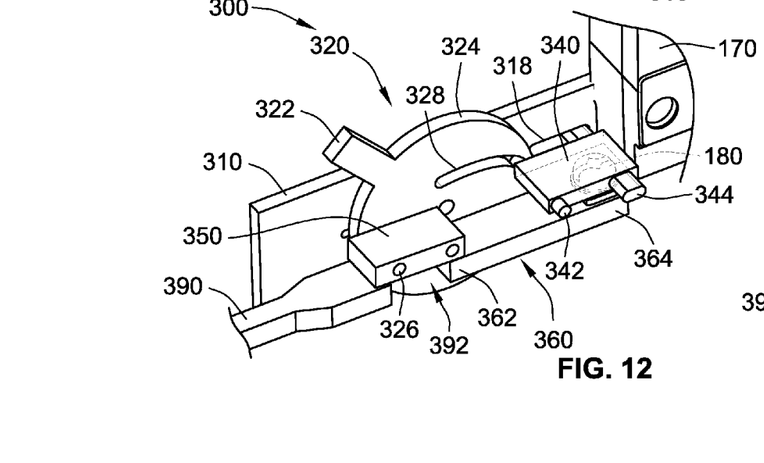
FIG. 12 illustrates a perspective cut-out view of a touch-safe bus connection device of FIG. 10, which is in a closed position configured to connect the bus extension to the stab and concurrently prevent direct user access to the bus extension.
Figure 13:
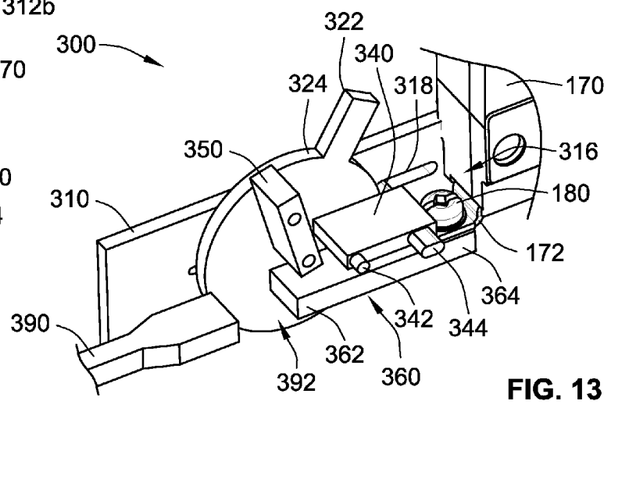
FIG. 13 illustrates a perspective cut-out view of the touch-safe bus connection device of FIG. 10 in the open position.

FIG. 11 illustrates a touch-safe bus connection device 300 for an electrical panel, in accordance with a third embodiment of the present disclosure. FIGS. 12 and 13 also show perspective cut-out views of the device 300 in a closed position and an open position, respectively. As with the device 200, the device 300 employs a lever switch with a lever handle and two discs; however, the device 300 has its electrical contact fixed to one or both discs.

The device 300 includes a non-conductive housing 310 (in FIG. 11) and a conductive bus extension 360 arranged inside the housing (in FIGS. 12 and 13). In FIG. 11, the housing 310 includes a pair of slots 312A on a top of the housing, and a corresponding pair of slots 312B on a bottom of the housing. The housing 310 also includes openings 314 and 316, and grooves 318 on opposite sides of the housing. In FIGS. 12 and 13, the bus extension 360 includes two ends 362 and 364. The end 362 is arranged at a gap 392 across from a stab 390 of an electrical panel via the opening 314 of the housing. An electrical device, such as the breaker 170, may be engaged and fastened to the end 364 of the bus extension 360 through the opening 316 of the housing 310.

As further shown in FIGS. 12 and 13, the device 300 also includes a lever switch 320, a non-conductive moveable cover 340 to cover and uncover the opening 316 of the housing 310, and a moveable electrical contact 350 to connect or disconnect the stab 390 and the bus extension 360 to or from each other, respectively, across the gap 392. In FIG. 11, the lever switch 320 includes a lever handle 322 and two discs 324. The discs 324 are arranged in parallel inside the housing 210. Each disc 324 has a portion extending out from a corresponding top slot 312A and bottom slot 312B of the housing 310. The handle 322 is a U-shaped lever handle having two ends, each of which is connected to a different disc 324. The electrical contact 250 is connected to one or both of the discs 324 by one or more shafts 326, as shown in FIGS. 12 and 13.

In FIGS. 12 and 13, each disc 324 includes a cam profile 328. The cover 340 includes a pair of spaced-apart extending tabs 342 and 344 on each side of the cover, and is arranged between the two discs 324. The tabs 342 on each side of the cover 340 are movably engaged to corresponding cam profile 328 of the two discs 324, and the tabs 344 on each side of the cover 340 are movably engaged to corresponding grooves 318 in the housing 310. The cam profile 328 is a groove or slot formed on each of the discs 324, and defines a movement path of the cover 340 when the discs 324 are rotated. In this example, the cover 340 and the electrical contact 350 are responsively connected to each other, across the discs 324.

The device 300 is operable via the lever switch 320 between an open position (in FIGS. 11 and 13) and a closed position (as shown in FIG. 12). As shown in FIGS. 11 and 13, the lever handle 322 is toggled in an open direction to concurrently and automatically move both the electrical contact 350 and the cover 340 towards each other to the open position. In particular, the movement of the switch 320, via the handle 322, in the open direction causes the discs 324 to rotate, and thus, responsively moves the electrical contact 350 and the cover 340 towards each other. As shown in FIG. 13, in the open position, the end 364 of the bus extension 360 and the stab 390 are disconnected from each other across the gap 392 and the opening 316 of the housing 310 is uncovered. Accordingly, the end 364 of the bus extension 360 is accessible through the opening 316 of the housing 310, and an electrical device, such as the breaker 170, may be connected to or disconnected from the bus extension 360.

As shown in FIG. 12, to move the device 300 to the closed position, the lever handle 322 of the lever switch 320 is toggled in a closed direction, which is opposite to the open direction, to concurrently and automatically move both the electrical contact 350 and the cover 340 away from each other. In particular, the movement of the switch 320, via the handle 322, in the closed direction causes the discs 324 to rotate, and thus, responsively moves the electrical contact 350 and the cover 340 away each other. In the closed position, the electrical contact 350 bridges the gap 392 to connect the end 362 of the bus extension 360 and the stab 390, and the opening 316 of the housing 310 is covered by the cover 340. Accordingly, as with the devices 100 and 200 (described above), the device 300 prevents direct user access to the bus extension 360 in the closed position, when the breaker 170 is connected to the bus extension 360 as well as when no breaker is connected to the bus extension 360.

Figure 14:
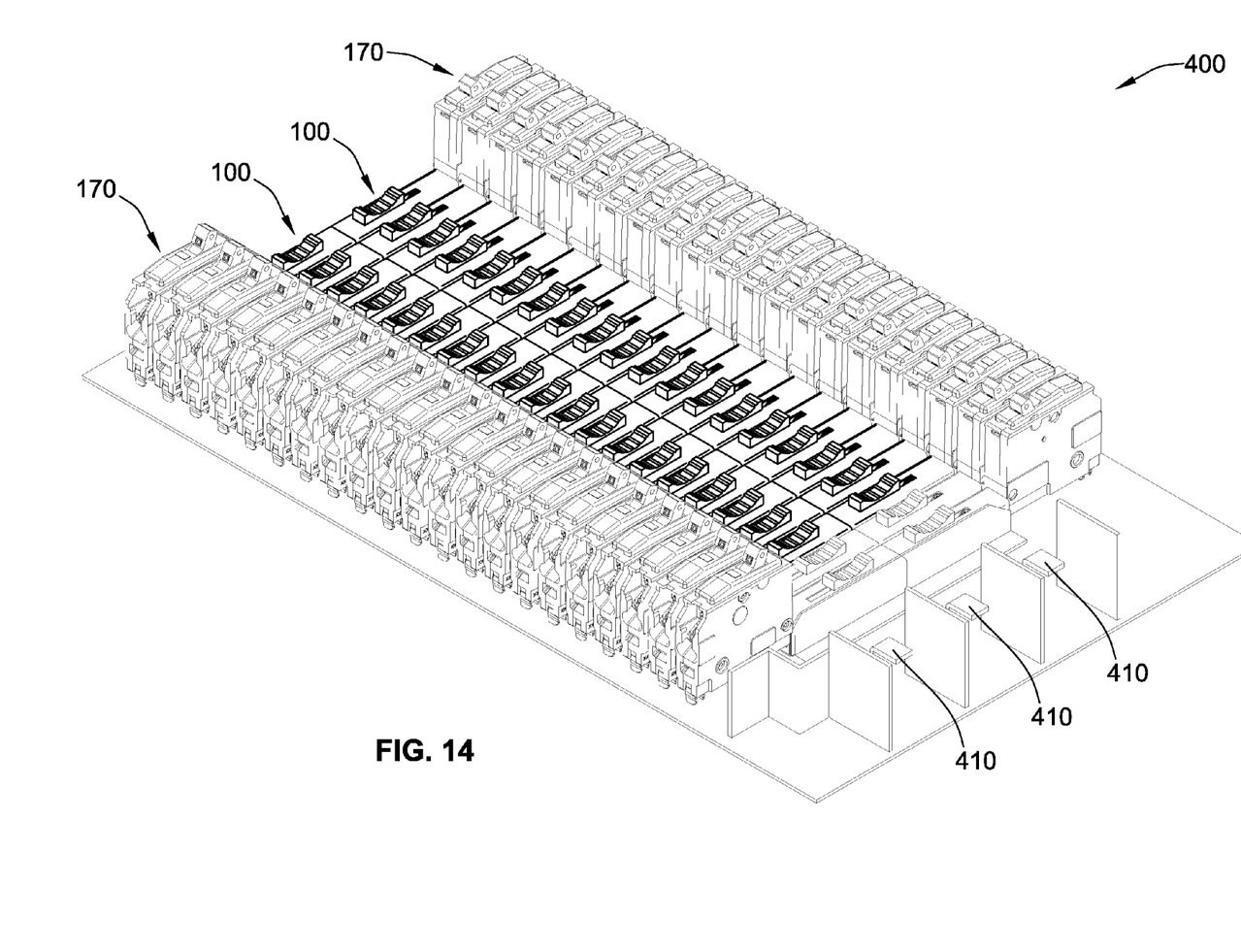
FIG. 14 illustrates a perspective view of an electrical panel having a plurality of the touch-safe bus connection device of FIG. 1 arranged in multiple rows, each row having two of the devices arranged side-by-side, in accordance with an embodiment of the present disclosure.

FIG. 14 illustrates a perspective view of an exemplary electrical panel 400 having a plurality of buses 410, a plurality of rows of touch-safe bus connection devices 100 of FIG. 1 arranged along a length of the panel, and a plurality of electrical devices, such as breakers 170. Each row includes two devices 100 arranged side-by-side, with each device 100 configured to interconnect or disconnect a terminal of a breaker 170 to or from a bus 410, respectively. The various components and operations of the device 100 are described in detail above with reference to FIGS. 1-7.

Figure 15:
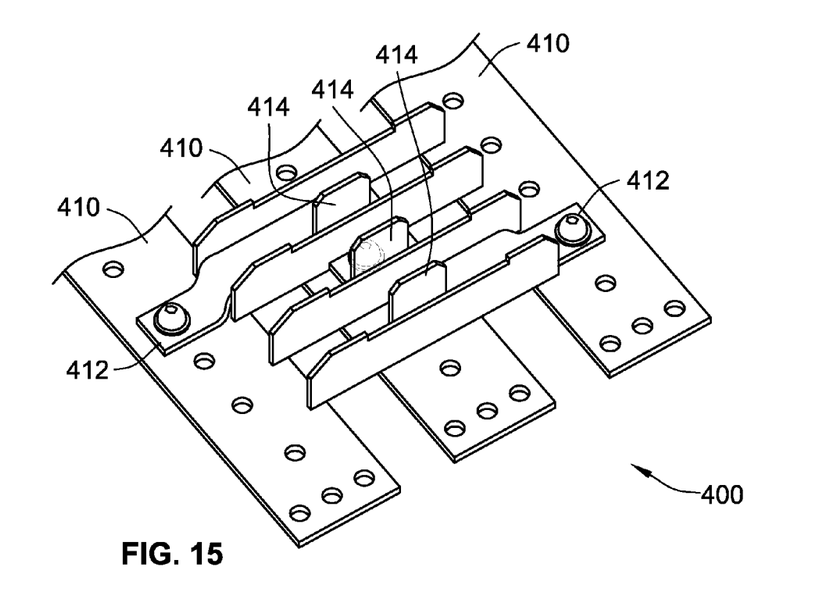
FIG. 15 illustrates a partial perspective view of buses, branch connectors and vertical stabs of the electrical panel of FIG. 14 in accordance with an embodiment of the present disclosure.
Figure 16:
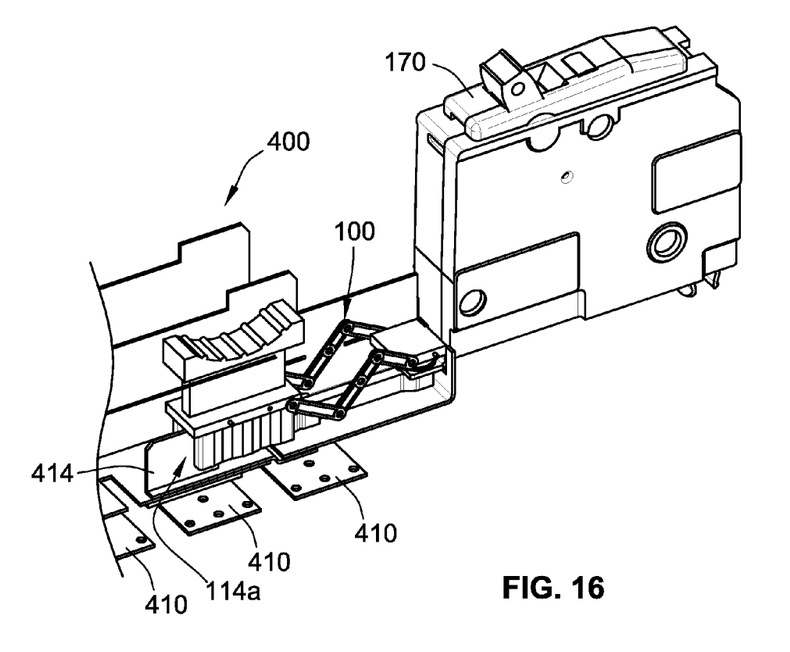
FIG. 16 illustrates a partial perspective cut-out view of the electrical panel of FIG. 14, with a cut-out view of one touch-safe bus connection device of FIG. 1 in the closed position in accordance with an embodiment of the present disclosure.
Figure 17:
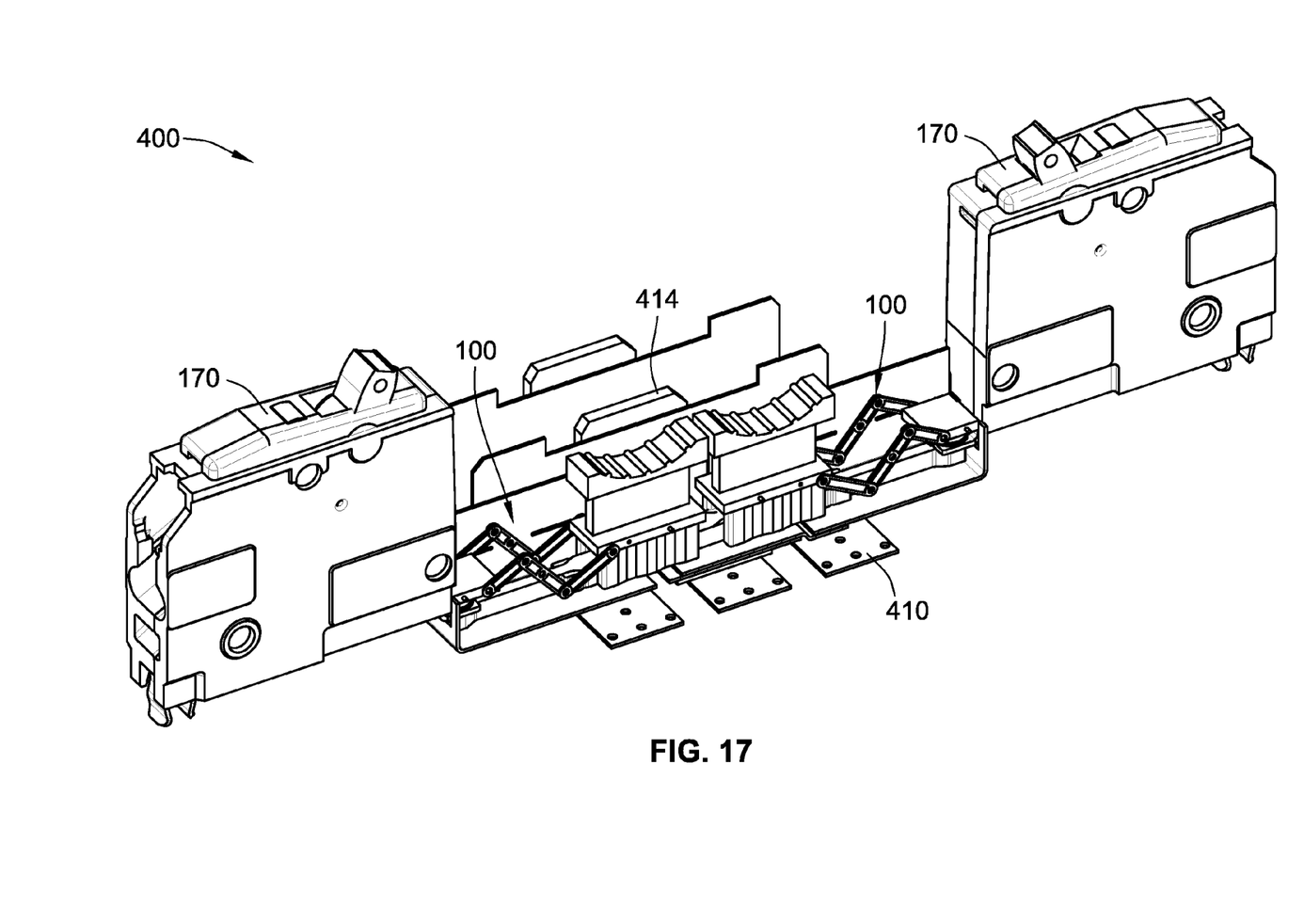
FIG. 17 illustrates a partial perspective cut-out view of the electrical panel of FIG. 14, with a cut-out view of two touch-safe bus connection devices of FIG. 1, which are in the closed position and are able to connect their respective bus extensions to a same vertical stab on the panel in accordance with an embodiment of the present disclosure.

As further shown in FIG. 15, the panel 400 may include branch connectors 412 fastened to the buses 410. The branch connectors 412 include one or more stabs 414. The stab 414 has a vertically extending connection area or point, or in other words, is a vertical stab. FIG. 16 shows a perspective cut-out view of one touch-safe bus connection device 100 in relations to one of the stabs 414 of FIG. 15. The device 100 includes a housing with an opening 114A in the form of a slot on the bottom of the housing, which allows the connection area of the stab 414 to extend into the housing and to be arranged across a gap from an end of the bus extension. FIG. 17 shows a perspective cut-out view of two touch-safe bus connection devices 100 that are arranged side-by-side in a row on the panel 400 to provide connection to a same stab 414 on the panel 400. In particular, the two devices 100 are arranged to provide interconnection to opposite ends of the connection area of the same stab 414 (covered by the electrical contact of the devices 100), with an end of the bus extension of one of the two devices 100 arranged across a gap from one end of the connection area of the same stab, and with an end of the bus extension of the other device 100 arranged across a gap from the other end of the connection area of the same stab 414.

In FIGS. 16 and 17, each of the devices 100 is in the closed position in which the bus extension of the device 100 is connected across a gap to the stab by the electrical contact, and the cover closes an opening of the housing to prevent direct user contact of the bus extension and the terminal of the breaker 170 when engaged to the end of the bus extension.

Although the panel 400 is shown with vertical stabs, it may use horizontal stabs or stabs of any size and shape suitable for use with a touch-safe bus connection device of the present disclosure. Likewise, the touch-safe bus connection devices of the present disclosure may be configured to receive stabs of varying sizes and shapes. Furthermore, instead of the device 100, the panel 400 may be employed with the touch-safe bus connection devices 200 or 300 or any combination of touch-safe bus connection devices in accordance with the present disclosure. The row of two touch-safe bus connection devices may also be formed as a single module, such as with a unitary housing.

In addition, the various components and configuration of the touch-safe bus connection devices 100, 200 and 300 of the present disclosure may include other components and modifications. These devices may include a mechanism to hold or maintain their switches at the open position or the closed position. For example, the switches 120, 220 and 320 of the devices 100, 200 and 300, respectively, may be spring-loaded, such as with a torsion spring and an extension spring, to hold the switch in the open or closed positions. Alternatively, the profile of the groove(s) 118 of the device 100 (in FIG. 3), the cam profiles 226 and 228 of the device 200 (in FIG. 9) and the cam profile 328 and groove(s) 318 of the device 300 (in FIG. 12) may be varied to include a dip or a hump at the open position and the closed position. Furthermore, the devices 200 and 300 also form a window 119 as in the device 100, when the devices are in the closed position.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A touch-safe bus connection device for an electrical panel, comprising:
    a bus extension having a first end to be arranged at a gap from a stab of the electrical panel, and a second end for connecting to a terminal of an electrical device;
    a non-conductive housing having the bus extension arranged therein, the housing including a first opening for allowing connection of the first end of the bus extension to the stab and a second opening for allowing connection of the terminal of the electrical device to the second end of the bus extension;
    a moveable electrical contact, arranged in the housing, for connecting or disconnecting the first end of the bus extension and the stab of the electrical panel across the gap; and
    a moveable non-conductive cover, concurrently movable with the moveable electrical contact, for uncovering or covering the second opening of the housing to allow or restrict, respectively, access to the second end of the bus extension,
    the electrical contact and the cover being moveable between (1) a first position at which the electrical contact bridges the gap to connect the first end of the bus extension and the stab and the second opening of the housing is covered by the cover, and (2) a second position at which the first end of the bus extension and the stab are disconnected from each other across the gap and the second opening of the housing is uncovered.

2. The touch-safe bus connection device according to claim 1, wherein the electrical contact and the cover are operatively connected to move away from each other to the first position, and to move towards each other to the second position.

3. The touch-safe bus connection device according to claim 1, further comprising a sliding switch, slidably connected to the housing, for moving the electrical contact and the cover between the first position and the second position.

4. The touch-safe bus connection device according to claim 3, wherein the sliding switch comprises:
   a non-conductive slider slidable along a longitudinal slot on the housing, the electrical contact being connected to a portion of the slider inside the housing; and
   a linkage arm connected between the cover and the slider, the slider being slidable in one direction to expand the linkage arm to move the electrical contact and the cover away from each other to the first position and being slidable in an opposite direction to retract the linkage arm to move the electrical contact and the cover towards each other to the second position.

5. The touch-safe bus connection device according to claim 1, further comprising a lever switch for moving the electrical contact and the cover between the first position and the second position.

6. The touch-safe bus connection device according to claim 5, wherein the lever switch comprises:
   a disc having a first cam profile and a second cam profile, the electrical contact being engaged to the disc to move according to the first cam profile, the cover being engaged to the disc to move according to the second cam profile; and
   a lever handle connected to rotate the disc,
   wherein the disc is rotatable in one direction with the lever handle to move the electrical contact and the cover away from each other to the first position, and is rotatable in an opposite direction with the lever handle to move the electrical contact and the cover towards each other to the second position.

7. The touch-safe bus connection device according to claim 5, wherein the lever switch comprises:
   a disc having a cam profile, the electrical contact being engaged at a fixed position on the disc, the cover being engaged to the disc to move according to the cam profile; and
   a lever handle connected to rotate the disc,
   wherein the disc is rotatable in one direction with the lever handle to move the electrical contact and the cover to the first position, and is rotatable in an opposite direction with the lever handle to move the electrical contact and the cover to the second position.

8. The touch-safe bus connection device according to claim 1, wherein, in the first position, the housing in combination with the cover form a window, which is configured to allow the terminal of the electrical device to extend therethrough.

9. The touch-safe bus connection device according to claim 1, wherein the moveable cover and the moveable electrical contact are responsively connected.

10. An electrical panel comprising:
    a bus having a stab; and
    a touch-safe bus connection device comprising:
       a bus extension having a first end to be arranged at a gap from the stab of the electrical panel, and a second end for connecting to the terminal of an electrical device;
       an non-conductive housing having the bus extension arranged therein, the housing including a first opening for allowing connection of the first end of the bus extension to the stab and a second opening for allowing connection of the terminal of the electrical device to the second end of the bus extension;
       a moveable electrical contact, arranged in the housing, for connecting or disconnecting the first end of the bus extension and the stab of the electrical panel across the gap; and
       a moveable non-conductive cover, concurrently movable with the moveable electrical contact, for uncovering or covering the second opening of the housing to allow or restrict, respectively, access to the second end of the bus extension,
       the electrical contact and the cover being moveable between (1) a first position at which the electrical contact bridges the gap to connect the first end of the bus extension and the stab and the second opening of the housing is covered by the cover, and (2) a second position at which the first end of the bus extension and the stab are disconnected from each other across the gap and the second opening of the housing is uncovered.

11. The electrical panel according to claim 10, wherein the bus includes a plurality of stabs arranged along a length of the electrical bus, each stab having associated therewith a corresponding touch-safe bus connection device for enabling interconnection of a terminal of an electrical device to a corresponding stab.

12. The electrical panel according to claim 11, wherein each stab includes a connection area that extends vertically, and the housing of the touch-safe bus connection device includes a bottom slot for allowing the connection area of the stab to extend into the housing and to be arranged across a gap from the first end of the bus extension.

13. The electrical panel according to claim 12, wherein the touch-safe bus connection device comprises a row of two touch-safe bus connection devices, each of the two touch-safe bus connection devices arranged to provide interconnection to opposite ends of the connection area of the same stab, the first end of the bus extension of one of the two touch-safe bus connection devices being arranged across a gap from one end of the connection area of the same stab, the first end of the bus extension of the other of the two touch-safe bus connection devices being arranged across a gap from the other end of the connection area of the same stab.

\* \* \* \* \*